(12) United States Patent
Holemans et al.

(10) Patent No.: US 6,918,839 B2
(45) Date of Patent: Jul. 19, 2005

(54) DAMAGE TOLERANT SHAFT

(75) Inventors: Peter Holemans, Sewell, NJ (US); Pierre Minguet, Wallingford, PA (US)

(73) Assignee: The Boeing Company, Seattle, WA (US)

( * ) Notice: Subject to any disclaimer, the term of this patent is extended or adjusted under 35 U.S.C. 154(b) by 52 days.

(21) Appl. No.: 10/058,952

(22) Filed: Jan. 28, 2002

(65) Prior Publication Data

US 2003/0144062 A1 Jul. 31, 2003

(51) Int. Cl.[7] ............................................. F16C 3/02
(52) U.S. Cl. ................................... 464/181; 464/183
(58) Field of Search .......................... 138/115, 116, 138/117, DIG. 2, DIG. 7; 464/181, 183; 264/46.5

(56) References Cited

U.S. PATENT DOCUMENTS

| | | | | |
|---|---|---|---|---|
| 661,109 A | * | 11/1900 | Schmitz .................. | 138/116 X |
| 724,909 A | * | 4/1903 | Maxwell ................... | 138/115 |
| 1,844,231 A | * | 2/1932 | Sipe et al. .............. | 464/183 X |
| 1,930,285 A | * | 10/1933 | Robinson ................ | 138/115 X |
| 2,340,926 A | * | 2/1944 | Bradley .................. | 138/115 X |
| 2,929,408 A | * | 3/1960 | Weatherwax et al. ... | 138/115 X |
| 3,110,754 A | * | 11/1963 | Witort et al. .......... | 138/115 X |
| 3,669,501 A | * | 6/1972 | Derleth .................. | 264/46.5 X |
| 3,792,141 A | * | 2/1974 | Offutt .................... | 264/46.5 X |
| 3,909,065 A | * | 9/1975 | Main ...................... | 264/46.5 X |
| 4,114,953 A | * | 9/1978 | Baumgartner | |
| 4,171,626 A | | 10/1979 | Yates et al. | |
| 4,374,881 A | * | 2/1983 | Hamilton ............... | 138/115 X |
| 4,452,314 A | | 6/1984 | Zion | |
| 4,513,601 A | * | 4/1985 | Herbulot ............... | 138/116 X |
| 4,838,833 A | | 6/1989 | Coursin | |
| 5,009,628 A | * | 4/1991 | Rouillot ................. | 464/181 X |
| 5,097,870 A | | 3/1992 | Williams | |
| 5,176,180 A | | 1/1993 | Williams et al. | |
| 5,178,387 A | | 1/1993 | Kuebler | |
| 5,397,272 A | * | 3/1995 | Smiley et al. .............. | 464/181 |
| 5,456,481 A | | 10/1995 | Allsop et al. | |
| 5,688,571 A | | 11/1997 | Quigley et al. | |
| 5,888,601 A | | 3/1999 | Quigley et al. | |
| 2001/0050110 A1 | * | 12/2001 | Born et al. ............ | 264/45.5 X |
| 2004/0089976 A1 | | 5/2004 | Bradley et al. | |

FOREIGN PATENT DOCUMENTS

| | | | | |
|---|---|---|---|---|
| CH | 17051 | * | 6/1898 | ................. 138/115 |
| DE | 681 109 | * | 9/1939 | ................. 464/183 |
| FR | 5.118 | * | 2/1838 | ................. 138/115 |
| FR | 617257 | * | 2/1927 | ................. 138/115 |
| FR | 964.069 | * | 8/1950 | ................. 138/115 |
| GB | 6697 | * | 6/1894 | ................. 138/115 |
| JP | 11-312421 | | 11/1999 | |

* cited by examiner

*Primary Examiner*—Greg Binda
(74) *Attorney, Agent, or Firm*—Alston & Bird LLP

(57) ABSTRACT

The damage tolerant shaft and associated method of fabricating a damage tolerant shaft provide a drive shaft that is tolerant of accidental and projectile damage to a portion of the drive shaft. The damage tolerant drive shaft is designed with internal ribs or lobes, such that a closed portion of the drive shaft will likely remain after the drive shaft is partially damaged. Thus, the damage tolerant drive shaft is able to continue proper operation after being partially damaged because the closed portion of the shaft creates a closed path around which the internal shear stresses that correspond to the required torque loads flow. In addition, the damage tolerant shaft and associated method provide damage tolerance without increasing the radius, wall thickness and/or weight of the drive shaft.

12 Claims, 3 Drawing Sheets

DAMAGE TOLERANT SHAFT

FIELD OF THE INVENTION

This invention relates to a shaft with internal connecting ribs that is tolerant of damage to a portion of the shaft because a closed path formed by the undamaged segment of the shaft and the internal connecting ribs continue to carry the torque loading on the shaft.

BACKGROUND OF THE INVENTION

Drive shafts are used in various vehicles, such as automobiles, aircrafts and rotorcrafts. Drive shafts generally connect a rotatable member to an engine that drives the rotation. The engine power rotates the drive shaft, which, in turn, rotates the workpiece. For example, rotorcrafts, such as helicopters, have drive shafts between the rotor, gearboxes and the fuselage-mounted engine(s) to enable the engine to drive the rotation of the rotor blades. The rotation of the rotor blades in relation to the motor creates torque on the drive shaft to transmit power. To ensure safe vehicle operation, the drive shaft must be designed to carry the necessary torque. In addition, the design process must take into account the potential for damage to the drive shaft.

The torque loading on a drive shaft creates internal shear stresses in the drive shaft. The internal shear stresses naturally flow around the outermost closed path of the drive shaft. Thus, in undamaged solid or hollow drive shafts, the internal shear stresses flow around the closed path of the outer perimeter of the drive shaft.

Many of the vehicles that utilize drive shafts are weight-sensitive, such as automobiles and aircraft that have weight limits under which they can safely and/or efficiently operate. Thus, the total weight of the vehicle components and the vehicle payload must comply with the weight limit. In order to increase the payload capacity, the weight of the vehicle components must decrease. In this regard, a drive shaft's weight is generally decreased by making it hollow. A hollow drive shaft's strength is comparable to that of a solid drive shaft while markedly decreasing the weight of the drive shaft. Drive shafts may be made of a range of material, including composites, aluminum, steel, plastic, and wood. In weight-sensitive applications, many drive shafts are made of composite materials that provide a high strength/weight ratio because they are made of layers of high-strength, stiff fibers, such as graphite, embedded in a binder material, such as epoxy resin. The composite materials also offer design flexibility that traditional construction materials, such as metal alloys, do not because the properties of composite materials can be adjusted to efficiently match the requirements of the specific application.

As mentioned above, drive shafts must be able to sustain certain types of damage and retain their ability to carry torque, thereby avoiding catastrophic and/or immediate failure. One type of damage that drive shafts made of composite materials must withstand is damage to the composite materials. The damage may occur accidentally during handling, such as dropping or hitting the drive shaft. While the individual layers of fibers have a very high strength, the adherence between the layers is not as strong and may be damaged by an impact such that the fiber layers or plies separate, which is commonly called delamination. The damaged portion of the drive shaft locally becomes an open cross-section, which decreases the torque load that the drive shaft can carry because the internal shear stresses in that portion of the drive shaft no longer flow about a closed path. This type of damage can be difficult to determine by visual inspection. Without repair, however, the damage will weaken the drive shaft and affect its ability to carry a torque load.

Another type of damage that the drive shaft must withstand is damage from projectiles. For example, the drive shafts of military rotorcraft may experience damage from ballistic projectiles; and the drive shafts of automobiles may experience damage from rocks and other debris that may hit an exposed drive shaft. Experience has shown that ballistic projectiles that hit along the edge of a shaft and create a "slit" along the edge of the shaft can significantly reduce the torsional strength of a shaft, while projectiles that hit in the center of a shaft and create separate entry and exit "holes" only moderately reduce the strength of the shaft.

The damage to the drive shaft may occur when the vehicle is in operation such that the drive shaft must remain operable in order to safely land and/or bring the vehicle to a stop and repair the damage. Safely landing and/or bringing the vehicle to a stop is difficult, however, because, like the damage due to accidents during handling, the projectile damage also creates a locally open section of the shaft, which decreases the torque load that the drive shaft can carry.

Drive shaft designers typically have three options to improve the damage tolerance of drive shafts. The first approach involves increasing the wall thickness of a hollow drive shaft to increase the remaining cross-section of the shaft that carries the torque load after a portion of the drive shaft is damaged. This approach suffers from the drawback that the weight of the drive shaft correspondingly increases, which is what the designers try to avoid. The second approach is to select stronger materials or modify the material properties of the composite, such as by changing the fiber orientation. The increase in damage tolerance of this approach, however, is fairly limited, particularly regarding projectile damage. The third approach consists of increasing the shaft diameter such that the damage area is a smaller percentage of the total area. This approach is often not available to the designer of a drive shaft because of space limitations.

Therefore, a need exists for a drive shaft that is tolerant of accidental and projectile damage to a portion of the drive shaft and able to continue to carry the required torque loads and the corresponding internal shear stresses after the damage. In particular, the need is for a drive shaft that achieves damage tolerance without increasing the radius, wall thickness and/or weight of the drive shaft.

SUMMARY OF THE INVENTION

The damage tolerant shaft and method of fabricating a damage tolerant shaft of the present invention provide a drive shaft that is tolerant of accidental and projectile damage to a portion of the drive shaft. Thus, the damage tolerant drive shaft is able to continue to properly operate after being partially damaged because the design of the shaft permits it to continue carrying the required torque loads and the corresponding internal shear stresses. The damage tolerant shaft and associated method are particularly advantageous because the shaft provides damage tolerance without increasing the radius, wall thickness and/or weight of the drive shaft.

One advantageous embodiment of a damage tolerant shaft includes an annular body that is symmetrical about an axis and a plurality of ribs extending inwardly from the annular body. The ribs connect within the interior of the annular body, such that a plurality of voids extend lengthwise between the ribs and annular body. The annular body and ribs may be made of a metallic, organic, inorganic, or a combination of organic and inorganic materials. The annular body and ribs of the shaft also may be made of a composite material and reinforcing fibers may extend through the annular body and/or the ribs, oriented in a direction perpendicular to the axis about which the annular body is symmetrical. Furthermore, the shaft may include a filler disposed within interstices between the annular body and plurality of ribs and between the plurality of ribs at the connection point within the interior of the annular body.

Another advantageous embodiment of a damage tolerant shaft includes a plurality of lobes and a filler material disposed between portions of adjacent lobes. The lobes are shaped relative to one another such that they may be positioned to define an annular body and a plurality of ribs extending within the annular body. The lobes may be formed of a composite material and each lobe may contain reinforcing fibers extending at least partially about a respective lobe. Additional reinforcing fibers oriented in a direction perpendicular to the axis about which the annular body is symmetrical may extend through the ribs to increase the strength of the shaft. An outer layer, which also may be formed of composite material, may surround the lobes to further define the annular body. The composite material of the outer layer may also contain reinforcing fibers extending at least partially about the lobes. If an outer layer surrounds the lobes, a filler material may also be disposed within interstices between the outer layer and the plurality of lobes.

Therefore, the embodiments of the damage tolerant shaft provide for an annular body with internal ribs, and do not increase the radius, wall thickness or weight of the drive shaft relative to conventional, hollow drive shafts. In addition, if a portion of the shaft is damaged, the remaining internal ribs and the remaining section of the annular body continue to provide a closed path to carry the torque loads and the corresponding internal shear stresses. A damaged drive shaft that nevertheless defines a closed path advantageously permits much greater torque loads to be supported than a damaged drive shaft with no closed path. If additional reinforcing fibers extend through the ribs, then the undamaged portion of the shaft is even more resilient to the torque loads and the corresponding internal shear stresses.

The method of fabricating a damage tolerant shaft includes forming a plurality of lobes from reinforcing fibers extending at least partially about each respective lobe, positioning the plurality of lobes relative to one another, filling the interstices between portions of adjacent lobes with filler material, impregnating the fibers forming the plurality of lobes with resin, and curing the plurality of lobes. The fibers that form the lobes may be impregnated and the lobes may be cured prior to positioning the lobes relative to one another. The position of the lobes relative to one another defines an annular body and plurality of ribs extending within the annular body.

One advantageous embodiment of the method of fabricating a damage tolerant shaft also may include surrounding the plurality of lobes with an outer layer formed of reinforcing fibers extending at least partially about the annular body of the shaft. The outer layer of fibers may be impregnated with resin, then may be cured. Curing the plurality of lobes may occur prior to curing the outer layer. Alternatively, the lobes and outer layer may be cured simultaneously.

The lobes of the ribs of the damage tolerant shaft may be reinforced with a plurality of reinforcing fibers oriented in a direction perpendicular to an axis about which the annular body is symmetrical. The additional reinforcing fibers that extend through the thickness of the lobes of the damage tolerant shaft provide additional strength for the shaft, particularly for the portion of the shaft that remains after the shaft is partially damaged. Furthermore, although the damage tolerant shaft has internal ribs that a conventional drive shaft does not, the additional strength provided by the internals ribs allows for a thinner annular body of the damage tolerant shaft than the outer wall of the conventional drive shaft, such that the weight of the damage tolerant shaft is equal to or less than the weight of a conventional drive shaft.

Thus, the damage tolerant shaft and associated method of fabricating a damage tolerant shaft provide a drive shaft that is tolerant of accidental and projectile damage to a portion of the drive shaft. As such, the damage tolerant shaft is able to continue to carry the required torque loads and the corresponding internal shear stresses after the damage. In addition, the shaft and associated method of fabrication achieve damage tolerance without increasing the radius, wall thickness and/or weight of the drive shaft.

BRIEF DESCRIPTION OF THE DRAWINGS

Figure 1:
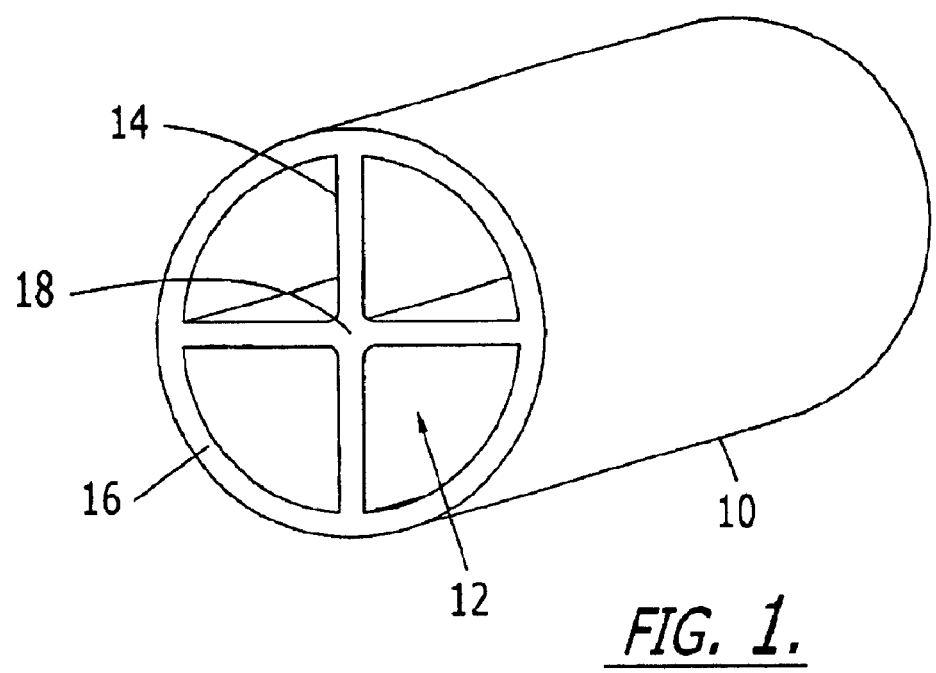
Figure 2:
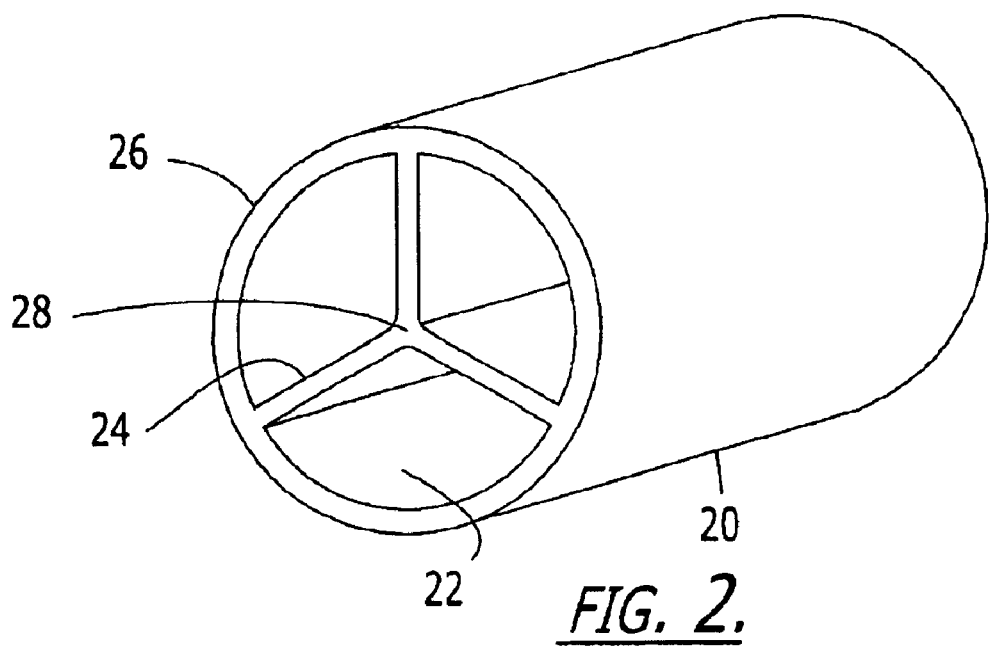
Figure 3:
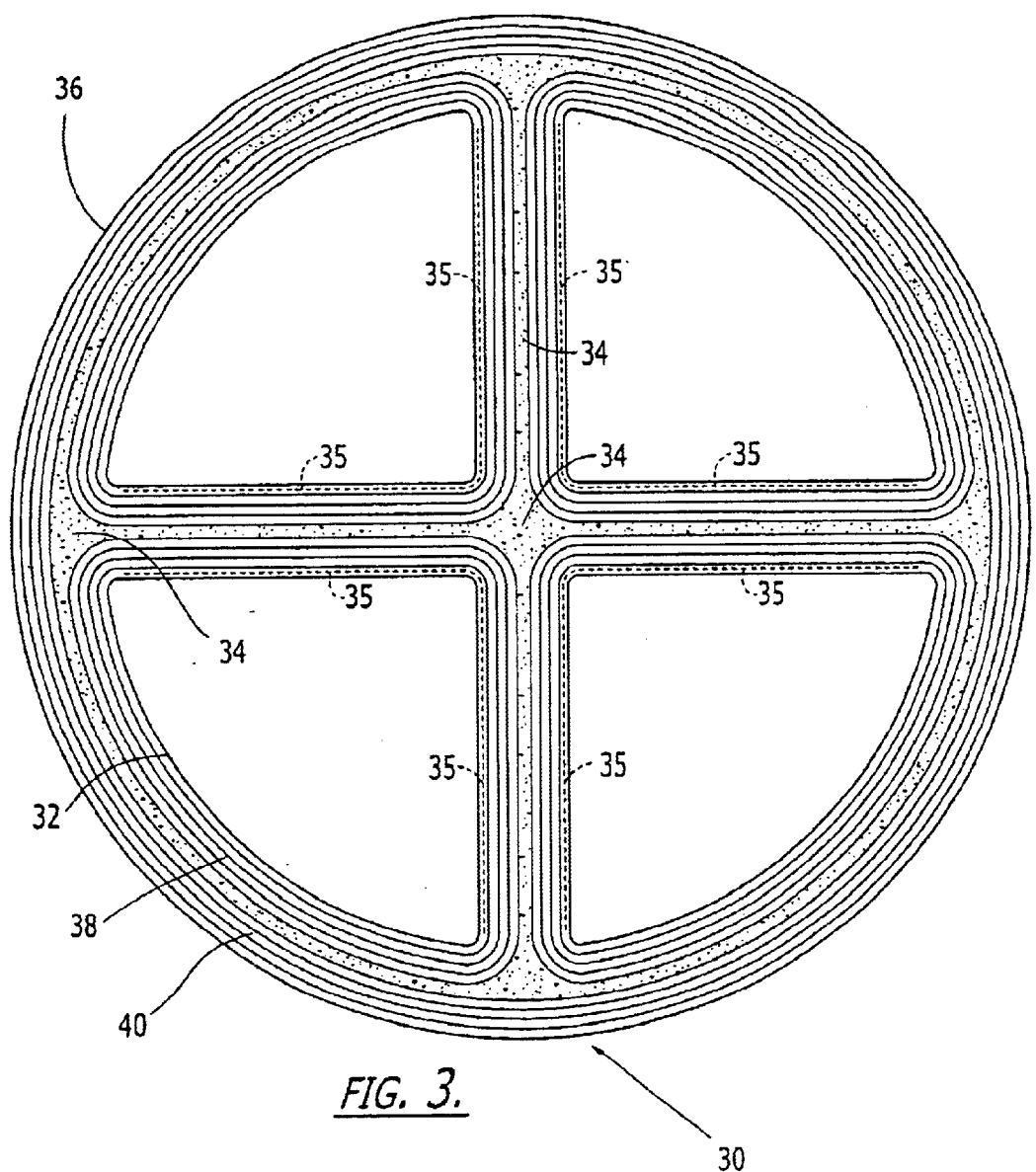
Figure 4:
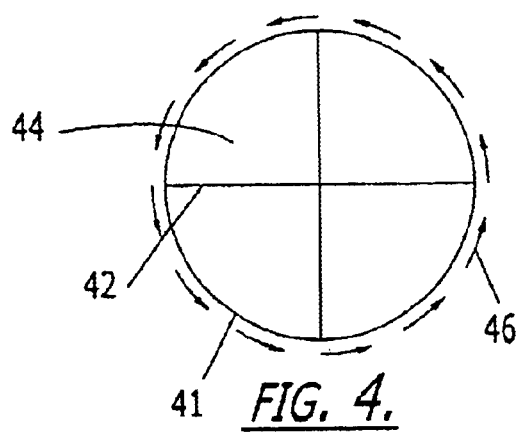
Figure 5:
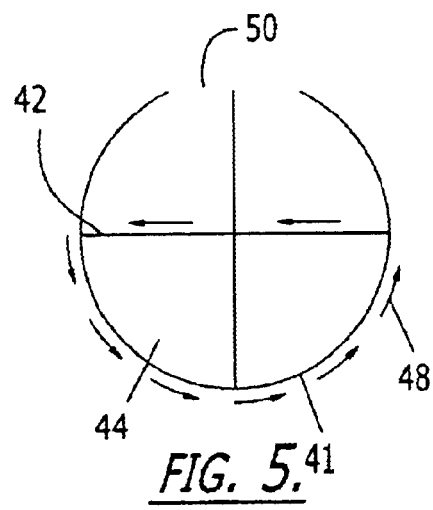
Figure 6:
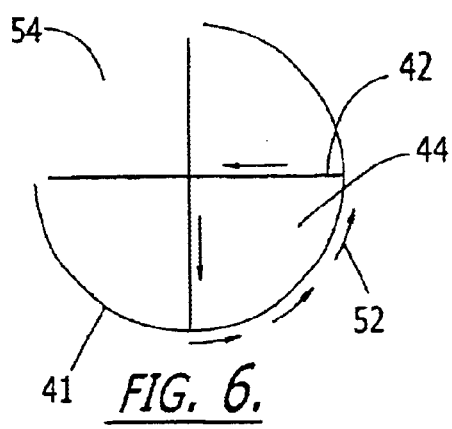

Having thus described the invention in general terms, reference will now be made to the accompanying drawings, which are not necessarily drawn to scale, and wherein:

FIG. 1 is a cross-sectional view of a damage tolerant shaft according to one embodiment of the present invention having four ribs and four lobes;

FIG. 2 is a cross-sectional view of a damage tolerant shaft according to another embodiment of the present invention having three ribs and three lobes;

FIG. 3 is a cross-sectional view of a damage tolerant shaft having lobes and an outer layer formed from a plurality of reinforcing fibers according to one embodiment of the present invention;

FIG. 4 is a representation of the flow of internal shear stresses around an undamaged shaft of one embodiment of the present invention;

FIG. 5 is a representation of the flow of internal shear stresses around a damage tolerant shaft of one embodiment of the present invention with damage to a small portion of the shaft; and FIG. 6 is representation of the flow of internal shear stresses around a damage tolerant shaft of one embodiment of the present invention with damage to a large portion of the shaft.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The damage tolerant shaft 10 according to one embodiment of the present invention is depicted in FIG. 1. As shown, the shaft includes an annular body 16 that is symmetrical about an axis and ribs 14 that extend inwardly from the annular body 16. The axis generally extends lengthwise through the annular body 16 at a location coincident with the center of the annular body 16. The ribs 14 also extend lengthwise along the annular body 16 and connect within the interior of the annular body 16 at a connecting point 18. The annular body 16 and ribs 14 cooperate to define voids 12 that extend lengthwise between the annular body 16 and ribs 14. The voids 12 may be hollow or filled with a filler material, such as foams, adhesives, syntactic resin, wood, aerogel or other compatible material. If the damage tolerant shaft 10 is to be used in a weight-sensitive application, then the voids 12 are preferably hollow or filled with a material of light or negligible weight. Through analysis or testing, the weight of the filler material can be traded against the weight of the shaft body itself to achieve the best load carrying capability for the least weight.

Although FIG. 1 shows a damage tolerant shaft 10 with four ribs 14 and four voids 12, a damage tolerant shaft may have two or more ribs to form two or more voids. For example, FIG. 2 depicts a damage tolerant shaft 20 that has an annular body 26 and three ribs 24 that extend from the annular body 26 and meet at a connecting point 28 to define three voids 22. The aspects of a damage tolerant shaft as discussed hereinabove regarding FIG. 1 also apply to any damage tolerant shaft with two or more ribs that form two or more voids, including the shaft 20 depicted in FIG. 2.

The annular body 16, 26 and ribs 14, 24 may be made of a composite material, such as graphite fibers impregnated with epoxy resin. As explained below, the fibers extend at various angles about the annular body 16, 26 and along the ribs 14, 24. Depending on the geometry of the shaft, the magnitude of the loading and the design requirements, the fibers will be oriented at various angles with respect to the axis of the shaft. The angles of the fibers may range from 90 degrees, which would extend circumferentially about a lobe, to 0 degrees, which would extend lengthwise through the lobe. Although composite materials are high strength, the annular body 16, 26 and/or the plurality of ribs 14, 24 may include additional reinforcing fibers oriented in a direction perpendicular to the axis about which said annular body is symmetrical. The fibers may be any type known to those skilled in the art, such as graphite, fiberglass, silicon carbide, aluminum oxide, astroquartz, and organic fibers such as Kevlar, Vectran, and PBO. The resin may be organic or inorganic, such as thermoset, thermoplastic, metallic and ceramic. In addition, the shaft may be made of metallic materials, such as aluminum titanium and steel. As also explained below, interstices may be defined between the annular body 16, 26 and the ribs 14, 24 and at the connection point of the ribs 18, 28. Any type of filler material, such as chopped carbon filler mixed with resin, unidirectional or fabric prepreg, organic or inorganic foam, adhesive, honeycomb core, syntactic resin, wood, aerogel or any other compatible material, may be used to fill interstices between the annular body 16, 26 and ribs 14, 24. The filler material may also fill the interstices between the ribs 14, 24 at the point of connection 18, 28.

The annular body 16, 26 and ribs 14, 24 may be formed separately, then assembled. Alternatively, the annular body 16, 26 and ribs 14, 24 may be formed concurrently as one piece. Any fabrication method for producing the elements or the entire shaft may be employed to achieve the desired shaft structure. For example, the elements or shaft may be fabricated using dry preform materials, such as unidirectional tape, fabric or woven preform, and resin transfer molding. Although the preferred embodiment of the method of fabricating a damage relies on the use of filamentary composite materials, other materials and methods of fabrication can be used to achieve similar benefits through the use of the multi-lobe design configurations. For metallic materials, other fabrication methods may include extrusion, casting, machining, fold and welding, drawing, roll and bending and powder metallurgy. The lobes may be fabricated by the previous methods and then assembled or the whole shaft can be fabricated by these methods. Additionally, other materials such as organic or inorganic materials may be used with an appropriate fabrication method to generate the internal lobe structure of the damage tolerant shaft of the present invention.

FIG. 3 illustrates another advantageous embodiment of the damage tolerant shaft of the present invention. This embodiment of the shaft 30 includes lobes 32 and filler 34 disposed between portions of the adjacent lobes. The lobes 32 are positioned relative to one another such that they define an annular body and ribs extending within the annular body. Moreover, the lobes 32 may be hollow or filled with a material. If the damage tolerant shaft 30 is to be used in a weight-sensitive application, then the lobes 32 are preferably hollow or filled with a material of light or negligible weight.

The lobes 32 may be formed of a composite material and the filler 34 may be any type of filler material known to those skilled in the art, such as chopped carbon filler mixed with resin, unidirectional or fabric prepreg, foam, adhesive and any other compatible material. According to one embodiment of the damage tolerant shaft, the lobes 32 may be fabricated from a plurality of unidirectional plies having reinforcing fibers 38, such as graphite fibers, and formed so that the fibers extend at least partially about the lobe 32. The reinforcing fibers 38 are then impregnated with resin, such as epoxy resin, and the lobes 32 are cured. Composite curing processes are well-known to those skilled in the art and involve preserving/finishing the composite material by converting the liquid resin to a solid, which creates a high strength material. The lobes 32 may be impregnated and cured prior to positioning the lobes 32 relative to one another. Alternatively, the lobes 32 may be impregnated and cured subsequent to positioning the lobes 32 relative to one another.

The damage tolerant shaft of this embodiment may also include an outer layer 36 that may surround the lobes 32 to further define the annular body. If the shaft 30 has an outer layer 36, then the filler 34 is also preferably disposed within the interstices between the outer layer 36 and the lobes 32. Like the lobes 32, the outer layer 36 also may be fabricated from unidirectional plies having reinforcing fibers 40 and formed so that the fibers extend at least partially about the lobes 32. The fibers of the lobes and the fibers of the outer layer may be woven as one structure or each could be woven separately. The reinforcing fibers 40 that form the outer layer 36 are also impregnated with resin and then cured to form a high strength material. The outer layer 36 may be formed, impregnated and cured subsequent to positioning and curing the lobes 32. Alternatively, the outer layer 36 and lobes 32 may be impregnated and cured simultaneously.

The fibers of the lobes 38 and outer layer 40 create a damage tolerant shaft 30 with considerable strength in the direction that the fibers 38, 40 are wound. To provide additional strength to the damage tolerant shaft 30, additional reinforcing fibers 35 oriented in a direction that is perpendicular to the axis about which the annular body is symmetrical may extend through the rib portion of the lobes 32. Since the composite material is typically a preform, all of the fibers of the lobes 32 are preferably impregnated and cured simultaneously.

Although FIG. 3 depicts a damage tolerant shaft with four lobes 32, the shaft may be formed from two or more lobes. The number and size of the lobes 32 in a damage tolerant shaft depend upon the application of the shaft and the damage requirements for that application. Damage requirements for drive shafts vary with the type of vehicle in which the drive shaft is located. One type of damage that drive shafts must withstand is internal damage to the composite materials of which the drive shaft is made. The damage may occur by accidental handling, such as dropping or hitting the drive shaft. While the individual layers of fibers have a very high strength, the binder between the layers is not as strong and may be damaged by an impact such that the fiber layers or plies separate, i.e., delaminate. The damaged portion of the drive shaft locally becomes an open section, which decreases the torque load that the drive shaft can carry because the internal shear stresses in that portion of the drive shaft no longer flow about a closed path. This type of damage can be difficult to determine by visual inspection. Thus, some form of non-detectable damage in composite shafts is typically taken into account as the shaft is designed and tested.

Another type of damage that the drive shaft must withstand is damage from projectiles. For example, the drive shafts of military rotorcraft may experience damage from ballistic projectiles or debris and the drive shafts of automobiles may experience damage from rocks and other debris that may hit an exposed drive shaft. The damage to the drive shaft may occur when the vehicle is in operation such that the drive shaft must sustain the damage in order to safely land and/or bring the vehicle to a stop and repair the damage. Safely landing and/or bringing the vehicle to a stop is difficult, however, because, like the accidental handling damage, the projectile damage also creates a locally open section of the shaft, which decreases the torque load that the drive shaft can carry.

The allowable size, type and/or magnitude of damage are typically defined by regulations or customer-approved design requirements. For example, drive shafts used in rotorcraft drive systems must be able to sustain partial damage from ballistic projectiles or debris and retain their ability to carry torque in order to safely land the rotorcraft.

Torque loading on a drive shaft creates internal shear stresses in the drive shaft and these stresses prefer to flow around the outermost closed path. FIG. 4 illustrates the flow of the internal sheer stresses 46 around the outside closed path of an undamaged drive shaft 41 with four internal ribs 42 and lobes 44 that is driving the rotation of a rotatable member and, thus, carrying torque.

The internal ribs 42 and lobes 44 provide damage tolerance to the drive shaft 41 by increasing the likelihood that a closed section will still be defined by the drive shaft if a portion of the outer wall of the shaft is damaged. FIG. 5 shows a damaged drive shaft 41 with a damaged portion 50. Although a portion of the outer wall of the shaft 41 and one of the ribs (or two of the lobes) are damaged such that a gap is now defined in the outer wall and one of the ribs is no longer directly connected to the outer wall, the internal sheer stresses 48 nevertheless have a closed path in which to flow. The closed path provided by the undamaged ribs or lobes is significantly stronger than an open portion of the shaft and, as such, the drive shaft can operate longer than a shaft with an open portion. Thus, the damage tolerant shaft 41 is safer for everyone in and around the vehicle when the damage occurs because the damage tolerant shaft 41 is more likely to operate at least long enough to land or halt the vehicle.

FIG. 6 depicts the drive shaft 41 having extensive damage to a large portion 54 of the outer wall of the shaft and two of the ribs (or three of the lobes). As shown, a relatively large gap is now defined in the outer wall and two ribs are no longer directly connected to the outer wall. The internal sheer stresses 52, however, still flow around a closed path. Thus, as long as at least two undamaged ribs remain connected to an undamaged portion of the outer wall of the drive shaft or at least one lobe is undamaged, the internal sheer stresses can flow around a closed path, which increases the likelihood that the damaged drive shaft will operate at least long enough to get the vehicle to safety.

Furthermore, the internal ribs 42 or lobes 44 provide damage tolerance for the drive shaft 41 without increasing the radius, wall thickness or weight of the drive shaft. Because the internal ribs or lobes create a stronger undamaged drive shaft, in addition to a stronger damaged drive shaft, the outer wall thickness of the damage tolerant shaft does not need to be as thick as the outer wall of a hollow drive shaft to carry the same amount of torque. Thus, when designed to carry the same amount of torque for the same vehicle, the weight of the damage tolerant shaft is no more than the weight of a hollow drive shaft. Additionally, because of the internal rib or lobe design of the damage tolerant drive shaft, it is not necessary for the damage tolerant drive shaft to have a larger radius than the radius of a hollow drive shaft carrying the same amount of torque for the same vehicle. In fact, the radius of the damage tolerant drive shaft may be smaller than that of a hollow drive shaft, designed to carry the same amount of torque for the same vehicle, due to the added strength provided to the undamaged and damaged drive shaft by the internal ribs or lobes.

Thus, the damage tolerant shaft and associated method of fabricating a damage tolerant shaft provide a drive shaft that is tolerant of accidental and projectile damage to a portion of the drive shaft. Because the design of the drive shaft is such that a closed path is likely to remain after a portion of the drive shaft is damaged, the damage tolerant shaft is able to continue to carry the required torque loads and the corresponding internal shear stresses after the damage. In addition, because the internal design of the damage tolerant drive shaft provides additional strength in an undamaged shaft, as well as a damaged shaft, the outer wall thickness of the damage tolerant shaft does not need to be as thick as that of a conventional hollow shaft, designed to carry the same amount of torque. Therefore, the shaft and associated method of fabrication achieve damage tolerance without increasing the radius, wall thickness and/or weight of the drive shaft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A damage tolerant shaft comprising:
  an elongate, annular body extending lengthwise and being symmetrical about an axis;
  a plurality of ribs extending inwardly from said annular body and connecting within an interior of said annular body; and
  a filler material disposed within interstices defined between said annular body and said plurality of ribs and between said plurality of ribs at a point of connection, wherein said annular body and said plurality of ribs cooperate to define elongate interstices extending lengthwise through the shaft such that said filler material also extends lengthwise through the shaft, wherein said annular body and said plurality of ribs cooperate to define a plurality of voids extending lengthwise therealong.

2. The damage tolerant shaft of claim 1, wherein said annular body and said plurality of ribs are made of a composite material.

3. The damage tolerant shaft of claim 2, wherein at least one of said annular body and said plurality of ribs includes a plurality of reinforcing fibers oriented in a direction perpendicular to the axis about which said annular body is symmetrical.

4. The damage tolerant shaft of claim 2 wherein said annular body and said plurality of ribs comprise a plurality of layered plies of composite material, and wherein each ply extends along and defines a portion of at least two ribs and an arcuate section of said annular body.

5. The damage tolerant shaft of claim 4 wherein said annular body further comprises a second plurality of layered plies of composite material that extend circumferentially thereabout.

6. The damage tolerant shaft of claim 1, wherein said annular body and said plurality of ribs are made of a metallic material.

7. The damage tolerant shaft of claim 1, wherein said annular body and said plurality of ribs are made of an organic material.

8. The damage tolerant shaft of claim 1, wherein said annular body and said plurality of ribs are made of an inorganic material.

9. The damage tolerant shaft of claim 1, wherein said annular body and said plurality of ribs are made of organic and inorganic materials.

10. A damage tolerant shaft comprising:

an annular body symmetrical about an axis;

a plurality of ribs extending inwardly from said annular body and connecting within an interior of said annular body; and a filler material disposed within interstices defined between said annular body and said plurality of ribs and between said plurality of ribs at a point of connection, wherein said annular body and said plurality of ribs cooperate to define a plurality of voids extending lengthwise therealong; and wherein said annular body and said plurality of ribs comprise a plurality of layered plies of composite material, and wherein each ply extends along and defines a portion of at least two ribs and an arcuate section of said annular body.

11. The damage tolerant shaft of claim 10 wherein said annular body further comprises a second plurality of layered plies of composite material that extend circumferentially thereabout.

12. The damage tolerant shaft of claim 10 wherein the layer plies include a plurality of reinforcing fibers oriented in a direction perpendicular to the axis about which said annular body is symmetrical.

* * * * *